United States Patent
Duka-Cort et al.

(10) Patent No.: US 11,352,037 B2
(45) Date of Patent: Jun. 7, 2022

(54) PERSONAL GROOMING MOBILE SERVICE CART

(71) Applicant: Mutha Pearl LLC, New York, NY (US)

(72) Inventors: Veronica Duka-Cort, New York, NY (US); Roberto DeJesus Hungria, New York, NY (US)

(*) Notice: Subject to any disclaimer, the term of this patent is extended or adjusted under 35 U.S.C. 154(b) by 0 days.

(21) Appl. No.: 17/074,941

(22) Filed: Oct. 20, 2020

(65) Prior Publication Data

US 2022/0119022 A1  Apr. 21, 2022

(51) Int. Cl.
| B62B 3/02 | (2006.01) |
| B62B 5/00 | (2006.01) |
| A47K 1/02 | (2006.01) |
| B62B 5/06 | (2006.01) |

(52) U.S. Cl.
CPC .......... *B62B 3/02* (2013.01); *A47K 1/02* (2013.01); *B62B 5/0013* (2013.01); *B62B 5/0083* (2013.01); *B62B 5/06* (2013.01); *B62B 2301/04* (2013.01)

(58) Field of Classification Search
CPC .......... B62B 3/02; B62B 5/0083; B62B 5/06; B62B 5/0013; B62B 2301/04; B62B 3/005; B62B 3/004; B62B 3/022; B62B 2202/67; B62B 2203/073; B62B 9/142; A47K 1/02
See application file for complete search history.

(56) References Cited

U.S. PATENT DOCUMENTS

| 8,075,071 | B1* | 12/2011 | Whittall ............... A47B 83/00 312/249.12 |
| 8,157,337 | B2* | 4/2012 | Manalang ............. B25H 3/06 312/249.8 |
| 10,040,470 | B1* | 8/2018 | Horowitz .............. B62B 3/007 |
| 10,137,916 | B1* | 11/2018 | Glassberg .............. B62B 3/02 |
| 2005/0242534 | A1* | 11/2005 | Woods .................... B62B 3/00 280/47.34 |
| 2015/0097348 | A1* | 4/2015 | Steinfels ........... F16M 11/2092 280/47.35 |
| 2015/0115786 | A1* | 4/2015 | Manalang .......... B25H 3/028 312/321.5 |
| 2019/0276062 | A1* | 9/2019 | Jackson ............. A61G 13/105 |

(Continued)

FOREIGN PATENT DOCUMENTS

| CN | 205215623 U | * | 5/2016 |
| CN | 107692587 A | * | 2/2018 |
| CN | 109568059 A | * | 4/2019 |

(Continued)

*Primary Examiner* — James A Shriver, II
*Assistant Examiner* — Ian Bryce Shelton
(74) *Attorney, Agent, or Firm* — Kristin Grant; Grant Attorneys at Law PLLC

(57) ABSTRACT

A mobile cart having a body and a canopy, the top of the body having a work surface which includes a flat panel on a front portion of the top and one or more open face top receptacles on a rear portion, the flat panel horizontally slidable for opening the front portion of the top of the body to reveal a top storage receptacle. The rear having one or more rear panels which can be opened to reveal a rear storage receptacle. The front having an open face front receptacle on a portion of the front. The bottom having four corners, each of its four corners having a caster proximal thereto.

16 Claims, 3 Drawing Sheets

(56) References Cited

U.S. PATENT DOCUMENTS

2021/0037964 A1* 2/2021 Lamson ................ A47B 31/02

FOREIGN PATENT DOCUMENTS

| CN | 208799451 U | * | 4/2019 | | |
| --- | --- | --- | --- | --- | --- |
| CN | 110143227 A | * | 8/2019 | | |
| CN | 209719647 U | * | 12/2019 | | |
| EP | 3100705 A1 | * | 12/2016 | ............. | A47B 31/04 |

* cited by examiner

PERSONAL GROOMING MOBILE SERVICE CART

BACKGROUND

Field of Invention

The present invention relates generally to mobile carts, and more specifically to personal grooming mobile service carts for use in providing hair, nail, skin, and beauty services.

Related Art

Mobile carts have existed for a number of years providing users with flexibility and mobility while providing various services. For example, U.S. Pat. No. 7,789,403B2 discloses a lightweight vanity cart with a mirror mounted on the top that can pivot from a closed to an open position. U.S. Pat. No. 7,213,817B2 discloses a foldable, four-wheel trolley of simple, lightweight construction for use in connection with the transport and storage of items of the type typically used in connection with the operation of beauty salons or similar uses. U.S. Pat. No. 7,144,020B2 discloses a transportable service cart with protective bumpers attached to the vertical corners of the service cart.

The present invention discloses a novel sleek mobile cart construction for use in providing hair, nail, skin, and beauty services.

SUMMARY OF INVENTION

It is to be understood that the phraseology and terminology employed herein are for the purpose of the description and should not be regarded as limiting.

The present invention is directed to a mobile cart having a body and a canopy. The body of the mobile cart having a top, a rear, a first side, a second side, and a bottom. The top having a work surface which includes a flat panel on a front portion of the top and one or more open face top receptacles on a rear portion of the top, the flat panel horizontally slidable for opening the front portion of the top of the body to reveal a top storage receptacle. The rear having one or more rear panels attached to the body by hinges, the one or more rear panels open about the hinges to reveal a rear storage receptacle. The front having an open face front receptacle on a portion of the front. The bottom having four corners, each of its four corners having a caster proximal thereto. The canopy attached to the body by two or more rods wherein at least one rod extends from each side of the rear portion of the top of the body to the rear of the canopy.

These and other features of the present invention will become readily apparent upon further review of the specification and drawings.

BRIEF DESCRIPTION OF THE DRAWINGS

Embodiments of the present invention will be described by way of example only, and not limitation, with reference to the accompanying drawings. The drawings are not necessarily drawn to scale and wherever possible, the same or like reference numbers are used throughout the drawings to refer to the same or like parts.

DETAILED DESCRIPTION

Figure 2:
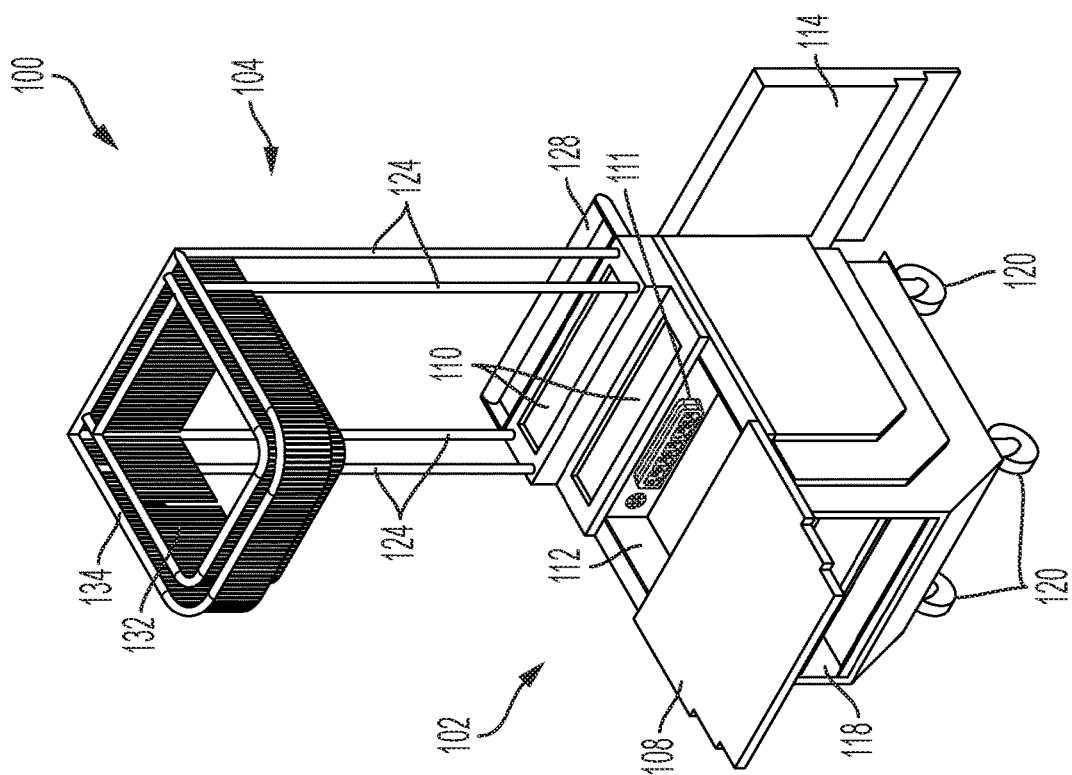
FIG. 2 is a front perspective view of a mobile cart in an open position according to an embodiment of the present invention.
Figure 1:
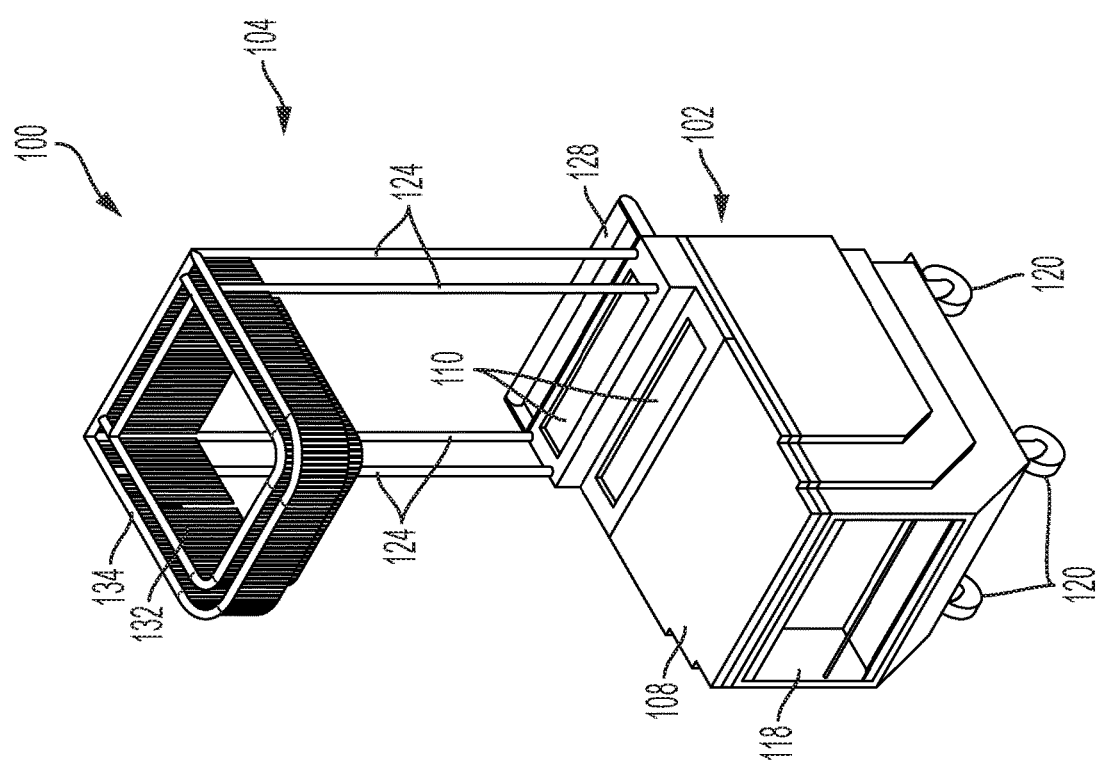
FIG. 1 is a front perspective view of a mobile cart in a closed position according to an embodiment of the present invention.
Figure 4:
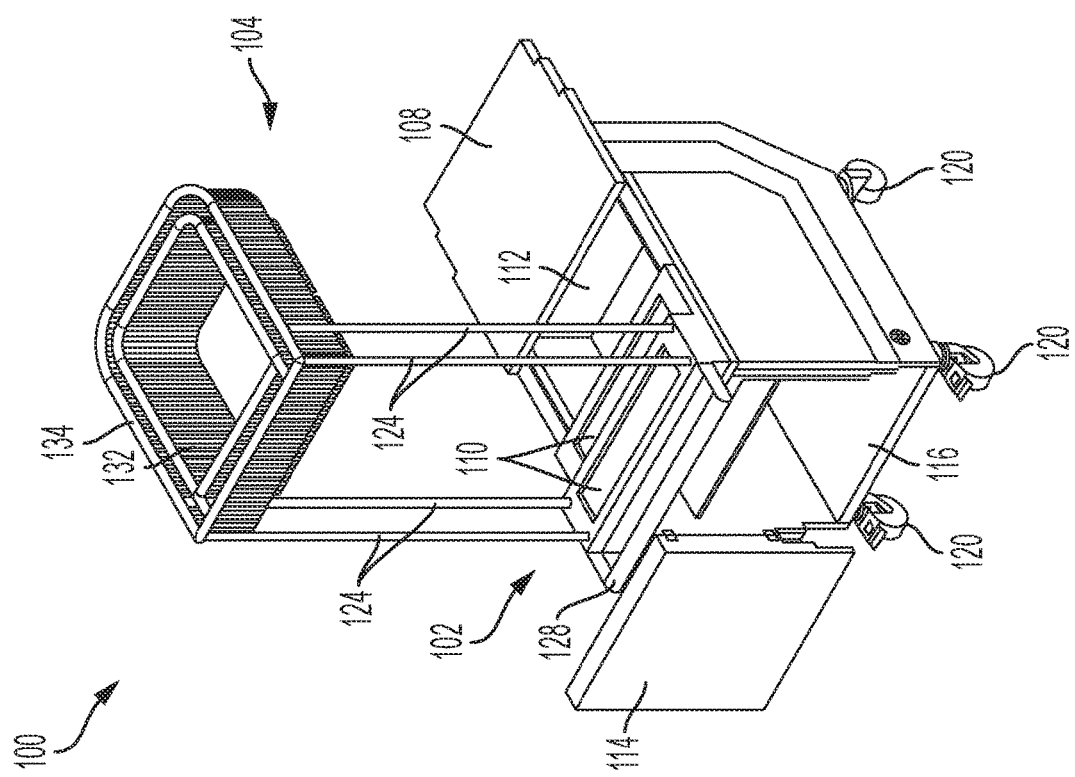
FIG. 4 is a rear perspective view of a mobile cart in an open position according to an embodiment of the present invention.
Figure 3:
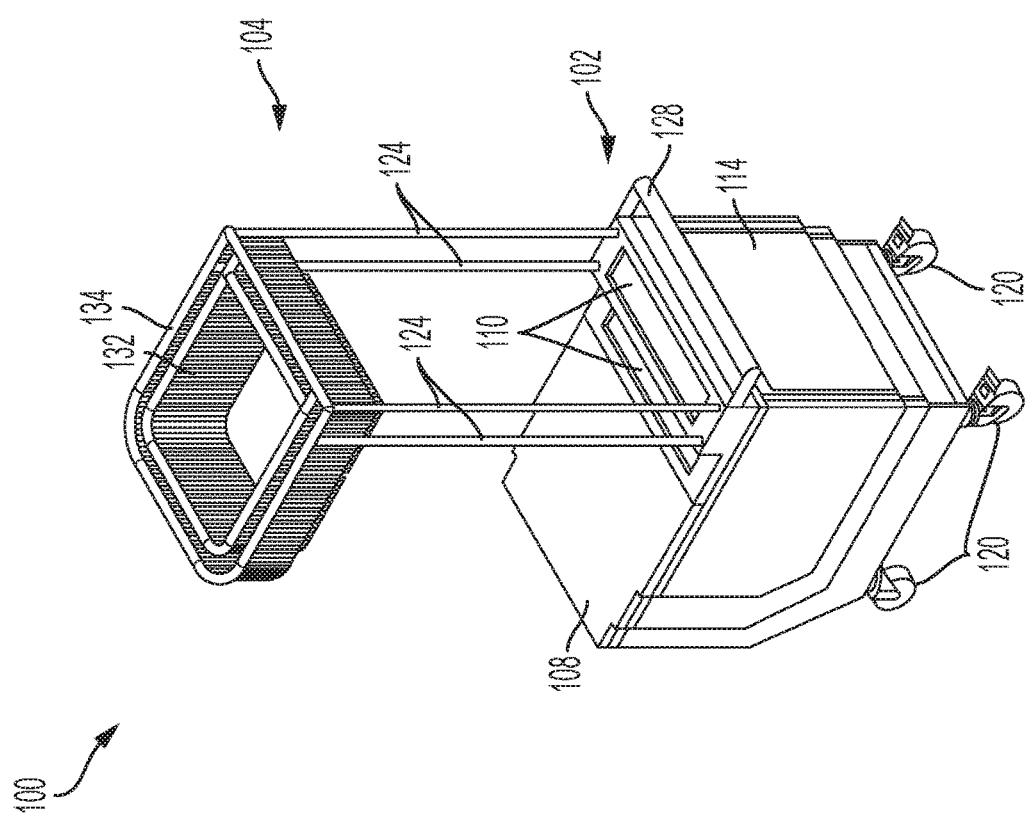
FIG. 3 is a rear perspective view of a mobile cart in a closed position according to an embodiment of the present invention.
Figure 5:
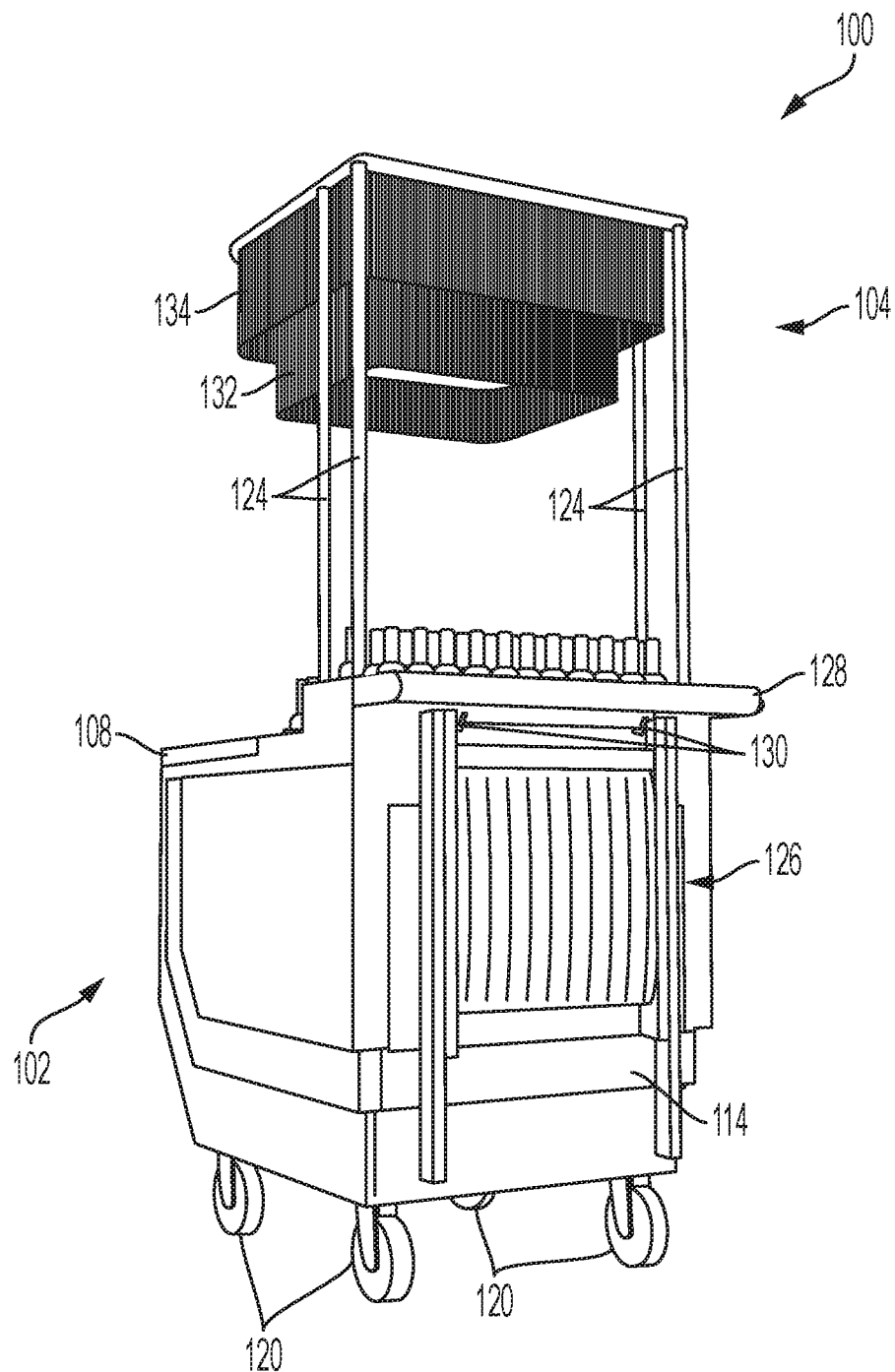
FIG. 5 is a rear perspective view of a mobile cart in a closed position with portable seat attached according to an embodiment of the present invention.

Referring now to the figures where similar reference characters denote similar elements throughout the figures, FIGS. 1 through 5 show a mobile cart 100 having a body 102 and a canopy 104. The body 102 of the mobile cart 100 having a top, a rear, a first side, a second side, and a bottom. The top having a work surface which includes a flat panel 108 on a front portion of the top and one or more open face top receptacles 110 on a rear portion of the top, the flat panel 108 horizontally slidable for opening the front portion of the top of the body 102 to reveal a top storage receptacle 112. The one or more open face top receptacles 110 may be permanently fixed, removable, or interchangeable. The flat panel 108 preferably slides forward toward the front of the mobile cart 100 however, in some embodiments of the present invention the flat panel 108 slides sideways in either direction toward either the first side or the second side. When the flat panel 108 is in a fully open position it sits flush with the edge of the top of the body 102. The top storage receptacle 112 containing an electrical outlet 111, preferably a surge protector.

The rear of the body 102 having one or more rear panels 114 preferably attached to the body 102 by hinges, the one or more rear panels 114 capable of being opened about the hinges to reveal a rear storage receptacle 116. In some embodiments of the present invention the one or more rear panels 114 are attached to the body 102 by any means commonly known in the art to allow the rear panels 114 to be slidably opened. The rear of the body 102 having a handlebar 128 for pushing the mobile cart 100 around. In some embodiments of the present invention, the rear of the body 102 has one or more hooks 130 for hanging a portable seat 126.

The front of the body 102 having an open face front receptacle 118 on a portion of the front of the body 102. The bottom of the body 102 having four corners, each of its four corners having a caster 120 proximal thereto. In a preferred embodiment of the present invention, two or more of the casters 120 have breaks to prevent the mobile cart 100 from moving while in use. In some embodiments of the present invention the casters 120 are removable. The canopy 104 attached to the body 102 by two or more rods 124 where at least one rod extends from each side of the rear portion of the top of the body 102 to the rear of the canopy 104. The canopy 104 may take any form generally known in the art however in a preferred embodiment the canopy 104 has an inner element 132 and an outer element 134, the outer element 134 spaced apart from and surrounding the inner element 132. The canopy 104 may be removable from the body 102.

The mobile cart may be made of any material commonly known in the art or any combination of materials. This may include but is not limited to wood, metal, hard plastic, stone, rubber, fabric.

This disclosure is not intended to limit the invention to the particular assembly disclosed, but, to the contrary, the intention is to cover all modifications, equivalents, and alternatives falling within the scope of the claims.

What is claimed is:

1. A mobile cart comprising:
   a) a body comprising:
      i) a top comprising a work surface, the work surface comprising a flat panel on a front portion of the top and one or more open face top receptacles on a rear portion of the top, the flat panel horizontally slidable for opening the front portion of the top of the body to reveal a top storage receptacle;
      ii) a rear comprising one or more rear panels attached to the body by hinges, the one or more rear panels open about the hinges to reveal a rear storage receptacle;
      iii) a first side;
      iv) a second side;
      v) a front comprising an open face front receptacle on a portion of the front; and
      vi) a bottom having four corners and a caster proximal to each of its four corners; and
   b) a canopy attached to the body by two or more rods wherein at least one rod extends from each side of the rear portion of the top of the body to a rear of the canopy, and wherein the canopy comprises an inner element and an outer element, the outer element spaced apart from and surrounding the inner element.

2. The mobile cart of claim 1, wherein the flat panel of the work surface sits flush with an edge of the top of the body when the flat panel of the work surface is in a fully open position.

3. The mobile cart of claim 1, wherein the top storage receptacle further comprises an electrical outlet.

4. The mobile cart of claim 1, wherein the casters are removable.

5. The mobile cart of claim, 1 wherein the canopy is removable from the body.

6. The mobile cart of claim 1, further comprising a handlebar attached to the rear of the body.

7. The mobile cart of claim 1, wherein the rear of the body further comprises one or more hooks for hanging a portable seat.

8. The mobile cart of claim 1, wherein the one or more open face top receptacles are removable.

9. A mobile cart comprising:
   a) a body comprising:
      i) a top comprising a work surface, the work surface comprising a flat panel on a front portion of the top and one or more open face top receptacles on a rear portion of the top, the flat panel horizontally slidable for opening the front portion of the top of the body to reveal a top storage receptacle;
      ii) a rear comprising one or more rear panels attached to the body, the one or more rear panels slidably opened to reveal a rear storage receptacle;
      iii) a first side;
      iv) a second side;
      v) a front comprising an open face front receptacle on a portion of the front; and
      vi) a bottom having four corners and a caster proximal to each of its four corners; and
   b) a canopy attached to the body by two or more rods wherein at least one rod extends from each side of the rear portion of the top of the body to a rear of the canopy, and wherein the canopy comprises an inner element and an outer element, the outer element spaced apart from and surrounding the inner element.

10. The mobile cart of claim 9, wherein the flat panel of the work surface sits flush with an edge of the top of the body when the flat panel of the work surface is in a fully open position.

11. The mobile cart of claim 9, wherein the top storage receptacle further comprises an electrical outlet.

12. The mobile cart of claim 9, wherein the casters are removable.

13. The mobile cart of claim 9, wherein the canopy is removable from the body.

14. The mobile cart of claim 9, further comprising a handlebar attached to the rear of the body.

15. The mobile cart of claim 9, wherein the of the body further comprises one or more hooks for hanging a portable seat.

16. The mobile cart of claim 9, wherein the one or more open face top receptacles are removable.

* * * * *